Aug. 29, 1950
E. REANEY
2,520,655
TOOLHOLDER
Filed Nov. 13, 1946
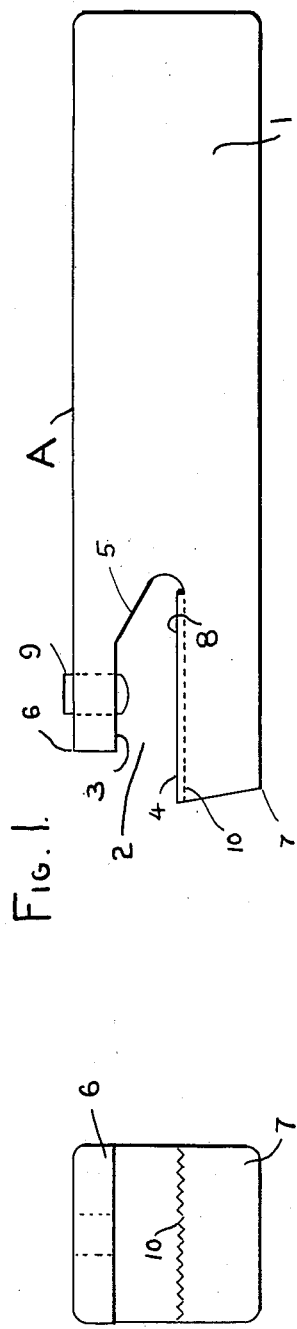
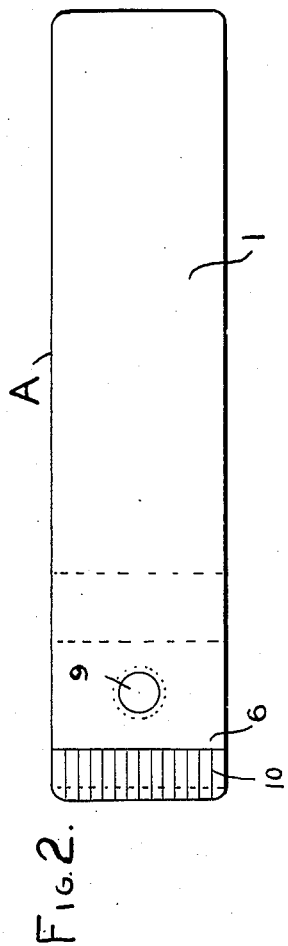
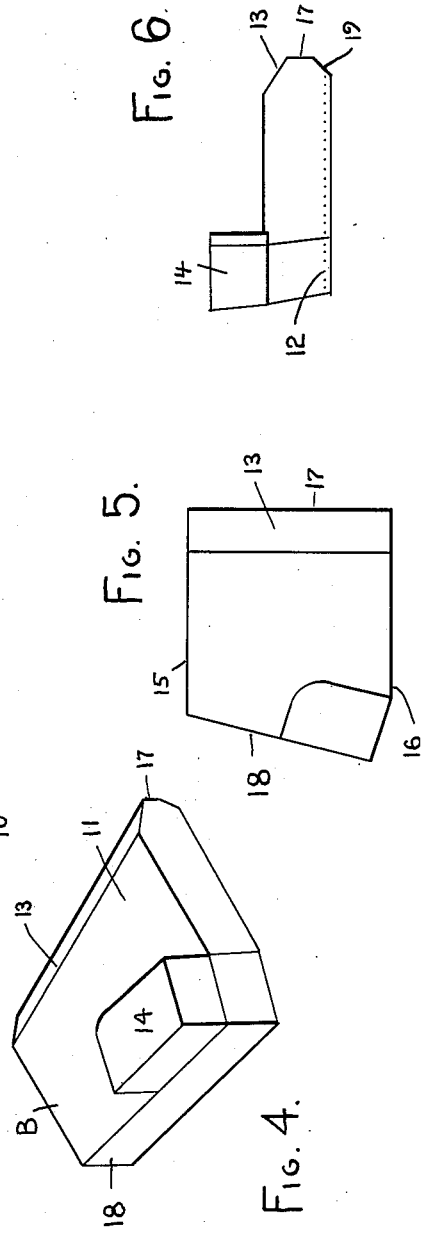
INVENTOR.
Ernest Reaney
BY Albert F. Nathan
Atty.

Patented Aug. 29, 1950

2,520,655

UNITED STATES PATENT OFFICE 2,520,655

TOOLHOLDER

Ernest Reaney, Stratford, Conn., assignor to The O. K. Tool Company, a division of Aerodynamic Research Corporation, Washington, D. C., a corporation of the District of Columbia Application November 13, 1946, Serial No. 709,462

1 Claim. (Cl. 29—96)

This invention undertakes to improve composite tools of the well-known type comprising a shank or holder per se and a replaceable bit of extreme hardness. Many arrangements of replaceable-bit tools have heretofore been proposed to meet the objections of the composite type in which the bit is permanently united to the shank. Each individual tool of the permanent bit type is cheaper to make but its life of usage is, of course, limited to the life of the bit itself, and many different individuals are required to suit the wide variety of cuts that the user must make. While the replaceable bit type answers the latter objection, such arrangements thereof as have been proposed, have been too troublesome to manufacture to compete in initial cost with the fixed bit type. It has been assumed by each designer that various peculiarities of design have been essential in order that the bit may be so seated in the shank that it will not be displaced when the tool is performing its cutting operation.

I have, however, discovered that by resorting to an exceedingly simple construction all of the aforesaid difficulties as well as others, may be overcome, and the element of cost greatly reduced and all the advantages of quickly replaceable bits achieved.

In the accompanying drawings, Fig. 1 is a side-elevation; Fig. 2 is a plan; and Fig. 3 an end-elevation of an assembled tool. Fig. 4 is a perspective of one of the many forms of replaceable bits which the shank can accommodate. Fig. 5 is a plan showing the shallow recessing of the shank ready for the brazing of the tip thereto; and Fig. 6 is a side-elevation of the same with the tip seated in place.

The shank or holder A of this tool is not made of forged tool-steel, as has heretofore been deemed imperative with former constructions, but is made of bar-stock of ordinary rectangular shape so that forging operations are avoided. In its end, a simple slot 2 is milled having its upper surface 3 parallel to its lower surface 4. Its back-wall 5 slopes to the rear at an angle of about 30°. Since the stock is not forged, appropriate lengths can be readily cut or sheared from the bar stock, and the milling out of the slot 2 can likewise be done quickly and without any difficulty by the milling cutter.

The upper over-hang 6, has its extremity cut off so that it is somewhat shorter than the lower over-hang 7 which serves as a seat 8 for the small shank of the bit; a set screw 9 extending through the upper overhang serving to press the bit onto said seat. The latter is provided with the usual serrations 10 running parallel with the length of the shank 1. These serrations are cut by a broach or drift because the space between the upper and lower surfaces 3 and 4 is insufficient to accommodate a milling cutter of the diameter that would be required for milling the slots and, furthermore, the broach is able to cut the serrations close to the sloping back wall 5.

The above-described simple proportions enable the replaceable bits B to be shaped with corresponding simplicity in respect to the portions thereof which are received within the slot 2 and hence enables bar-stock to be used in making the same; thereby eliminating forging operations and otherwise reducing the cost thereof. The bit B is composite and consists of a small shank 11 having serrations 12 on its under surface to fit those of the seat 8 of the holder, and at its rear edge is provided with a small incline 13 corresponding in angularity with the rear wall 5 of the holder. The cutting tip 14 of the replaceable bit uprises at its forward extremity where it is permanently secured to the small shank 11.

To make such bits, bar stock of rectangular cross-section and conventional lengths is also severed into short pieces having parallel sides 15 and 16 and a right-angled rear end 17; its front end 18 being at the angle appropriate for purpose for which the bit is to be used. That is, whether it is for producing right hand or left hand cuts, etc. a wide variety of operations according to the specific character of the bit per se. To each such shank, an appropriately shaped bit 14 is permanently brazed, and to facilitate this operation and ensure correct orientation, a slight recess is milled in the upper surface at the forward end of the blank; the bit being seated in this recess when being brazed thereto.

The rear end of the blank is milled to form a 30° facet, which seats on the corresponding back-wall 5 of the main shank or holder A. The under-face of the blank is also serrated as indicated by 12 so that the replaceable bit may be set in any desired lateral relation in its holder. It may be explained, that the aforesaid construction has been found by many tests to be self-sustaining during usage, irrespective of the set screw 9, and no displacement of the bit will occur during severe cutting operations. The small facet 19 in the rear-wall of the body 11 of the replaceable bit 13 serves no purpose in holding it in place, but is to provide clearance at the rear end of the serrations to ensure a bearing of the facet 13 against the facet 5 of the holder. The cutting bit is composed of an exceedingly hard material such as tungsten carbide, and, as shown, uprises from the body 11 sufficiently to permit considerable grinding and re-sharpening before necessitating discarding.

I claim:

A metal cutting tool comprising a holder and a replaceable bit adjustably mounted therein; said holder consisting of an elongated rectangular member having a slotted forward end providing parallel upper and lower surfaces and a rear wall extending transversely and sloping downwardly and rearwardly from the upper surface and at the rear thereof at an angle of about 30°, the lower surface having serrations extending rearwardly and the upper surface being provided by an overhanging lip terminating short of the forward end of the holder, and having a set-screw in its middle; the replaceable bit being composite and formed with a body having parallel side edges and a transverse rear end presenting a facet sloping at an angle of about 30° downwardly and rearwardly which seats against the rear wall of the holder when in assembled position, said body having a shallow recess in an upper corner thereof, and a cutting bit seated in said recess and permanently brazed therein to said body.

ERNEST REANEY.

REFERENCES CITED

The following references are of record in the file of this patent:

UNITED STATES PATENTS

| Number | Name | Date |
|---|---|---|
| 1,443,752 | Lindmark | Jan. 30, 1923 |
| 2,063,128 | Severson | Dec. 8, 1936 |
| 2,414,231 | Kraus | Jan. 14, 1947 |